(12) United States Patent
Fuentes (10) Patent No.: US 6,827,852 B2
(45) Date of Patent: Dec. 7, 2004

(54) FLUID FILTER

(76) Inventor: Jaime Fuentes, 1321 Wisconsin Dr., Berwyn, IL (US) 60402

( * ) Notice: Subject to any disclaimer, the term of this patent is extended or adjusted under 35 U.S.C. 154(b) by 83 days.

(21) Appl. No.: 10/361,076

(22) Filed: Feb. 7, 2003

(65) Prior Publication Data

US 2004/0154976 A1 Aug. 12, 2004

(51) Int. Cl.[7] .............................................. B01D 35/34
(52) U.S. Cl. ...................... 210/232; 210/452; 210/455; 210/489; 220/613; 220/622
(58) Field of Search ................................ 210/232, 435, 210/451, 452, 455, 489; 220/612, 613, 622

(56) References Cited

U.S. PATENT DOCUMENTS

| | | | | |
|---|---|---|---|---|
| 1,348,536 A | * | 8/1920 | Billings et al. | 210/452 |
| 5,028,323 A | * | 7/1991 | Gould et al. | 210/232 |
| 5,750,022 A | * | 5/1998 | Blake et al. | 210/169 |

* cited by examiner

Primary Examiner—Matthew O. Savage
(74) Attorney, Agent, or Firm—Wood, Phillips, Katz, Clark & Mortimer (57) ABSTRACT

The invention is directed to a fluid filter having a housing assembly defining a chamber through which fluid to be filtered can flow between an inlet and an outlet, a filtering assembly within the chamber through which fluid moving between the fluid inlet and fluid outlet passes, and a cover assembly. The housing assembly has an opening through which at least a part of the filtering assembly can be directed into an operative position within the chamber. The cover assembly seals the opening. The housing assembly has a housing body and a base plate connected to the housing body. The base plate is secured to the housing body through at least one weld and a plurality of mechanical fasteners.

27 Claims, 8 Drawing Sheets

FLUID FILTER

BACKGROUND OF THE INVENTION

1. Field of the Invention

This invention relates to filters and, more particularly, to a filter for separating impurities from a fluid.

2. Background Art

Fluid filters are used in a wide range of environments. In many applications, the medium being filtered is caustic and tends to degrade metal filter components. Accordingly, many filters are made with non-metal components which may vary in composition depending upon the nature of the fluid to be filtered.

The use of non-metal filters has presented a challenge to designers of these filters. The fluid being filtered may be directed through the filter at a relatively high pressure. Designers of these filter systems strive to develop systems that have the requisite filtering capacity at potentially high volume and pressures without fluid leakage to the outside environment.

A particular challenge in this respect has been the design of the main housing which defines the primary filtering chamber. To achieve the above ends, these housings have been made in the past from joined plastic components. In one such form, a cylindrical material is used to define the main filtering chamber. The bottom of the chamber, typically defining the fluid outlet, is sealed by a separate base plate which must be joined to the cylindrical stock material in such a manner that the connection is both mechanically of the requisite strength and capable of preventing leakage between the parts.

SUMMARY OF THE INVENTION

In one form, the invention is directed to a fluid filter having a housing assembly defining a chamber through which fluid to be filtered can flow between an inlet and an outlet, a filtering assembly within the chamber through which fluid moving between the fluid inlet and fluid outlet passes, and a cover assembly. The housing assembly has an opening through which at least a part of the filtering assembly can be directed into an operative position within the chamber. The cover assembly seals the opening. The housing assembly has a housing body and a base plate connected to the housing body. The base plate is secured to the housing body through at least one weld and a plurality of mechanical fasteners.

In one form, the housing body and base plate have cooperating portions that reside, one within the other, with the housing body and base plate operatively connected.

In one form, the housing body and base plate each have a central axis. The cooperating portions define a seam that extends continuously around the central axes. The at least one weld is formed at the seam.

The cooperating portions may be defined by a non-metal material, such as plastic.

The weld may likewise be defined by a non-metal material and may be the same as the non-metal material defining the cooperating portions.

In one form, the non-metal material is made from at least one of: (a) polyvinyl chloride (PVC); (b) polypropylene (PP); (c) chlorinated polyvinyl chloride (CPVC); and (d) polyvinylidene difluoride (PVDF).

In one form, the base plate defines the fluid outlet.

A second weld may be made over the at least one weld.

In one form, the at least one weld extends continuously around the central axes.

The at least one weld may be formed by a material that is initially separate from the cooperating portions.

In one form, the at least one mechanical fastener extends into the housing body and base plate.

The at least one mechanical fastener may be a threaded fastener, and in one form is a self-tapping fastener.

In one form, the cooperating portion on the housing body has an annular edge extending around a central axis and the at least one mechanical fastener extends into the annular edge.

In one form, the base plate has a stepped through bore with a larger diameter portion and a smaller diameter portion. The at least one mechanical fastener has an enlarged head and is directed through the through bore into the annular edge so that the enlarged head is countersunk within the larger diameter portion of the through bore.

In one form, the base plate is made from a non-metal material and the at least one mechanical fastener is spin-welded to the base plate.

A filler material may fill the larger diameter portion of the through bore.

In one form, there are a plurality of mechanical fasteners extending through the base plate into the annular edge.

In one form, the annular edge has a circumferential extent and the plurality of mechanical fasteners are spaced at prescribed intervals around the circumferential extent of the annular edge.

The prescribed intervals may be substantially equal.

In one form, 5–10 mechanical fasteners are used.

The housing body may be pre-drilled to receive the at least one mechanical fastener.

In one form, the filtering assembly has a wall structure capable of operatively supporting a filter material so that fluid to be filtered can pass through the filter material operatively supported by the wall structure as fluid to be filtered flows between the fluid inlet and fluid outlet.

The wall structure may define a perforate, cup-shaped receptacle.

The filtering assembly may further include a filter bag that is supported by the wall structure within the cup-shaped receptacle.

DETAILED DESCRIPTION OF THE DRAWINGS

Figure 1:
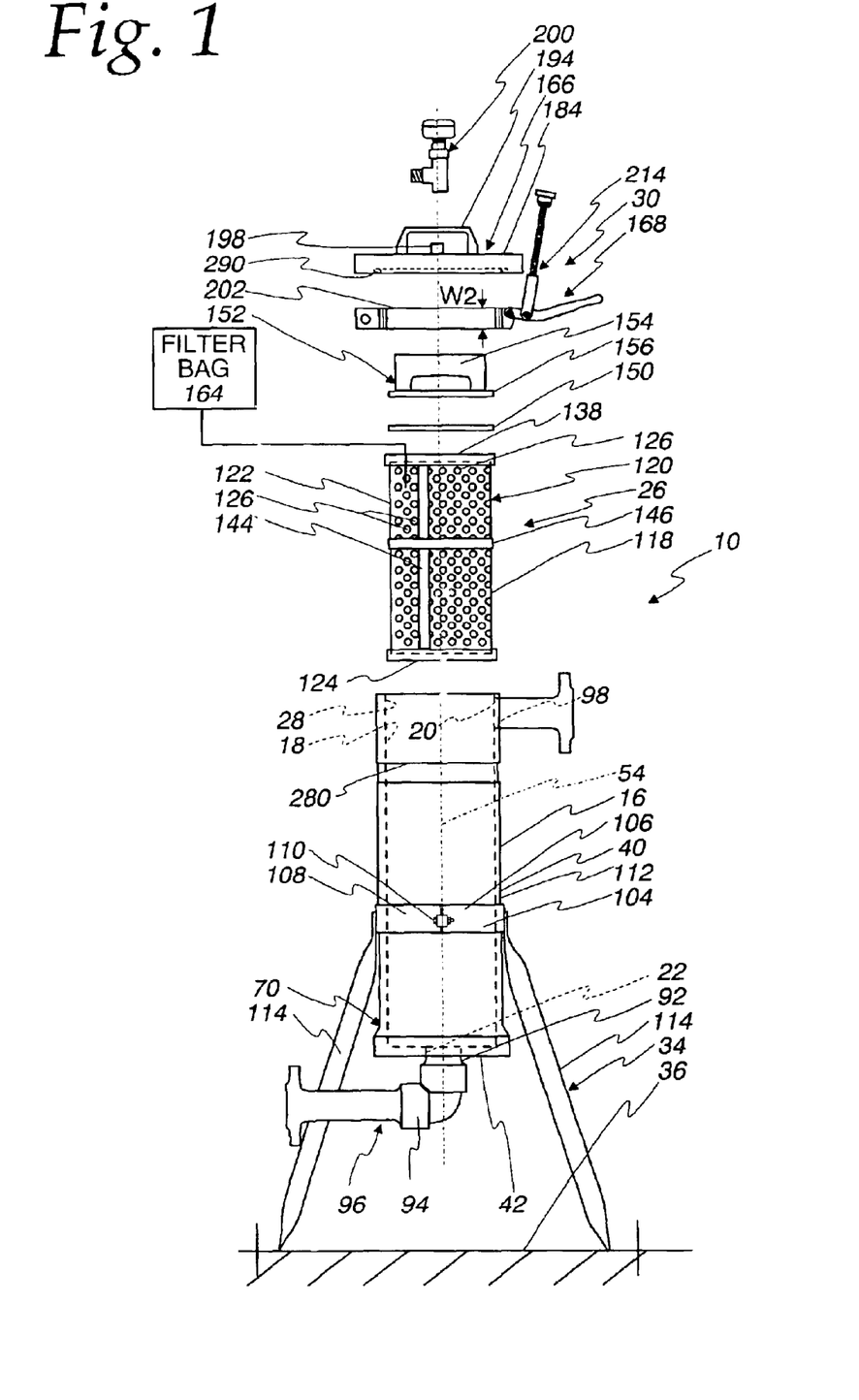
FIG. 1 is an exploded, elevation view of a fluid filter, according to the present invention, and consisting of a housing assembly defining a chamber through which filtering fluid passes, a filtering assembly within the chamber, a mounting base for supporting the housing assembly, and a cover assembly for closing an opening communication with the chamber and through which the filtering assembly within the chamber is accessed.
Figure 2:
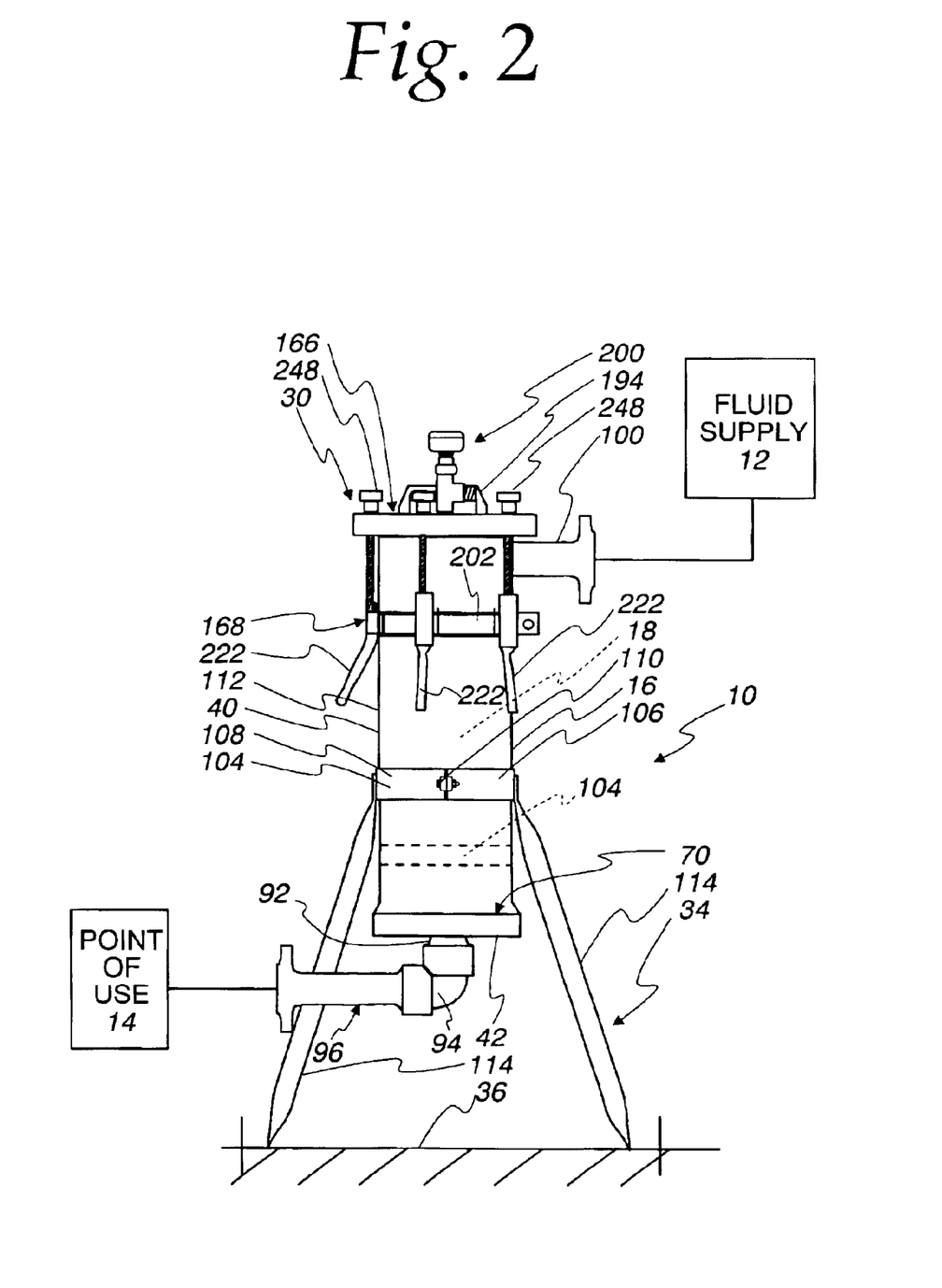
FIG. 2 is a view as in FIG. 1 with the fluid filter in an operative state.
Figures 3, 4:
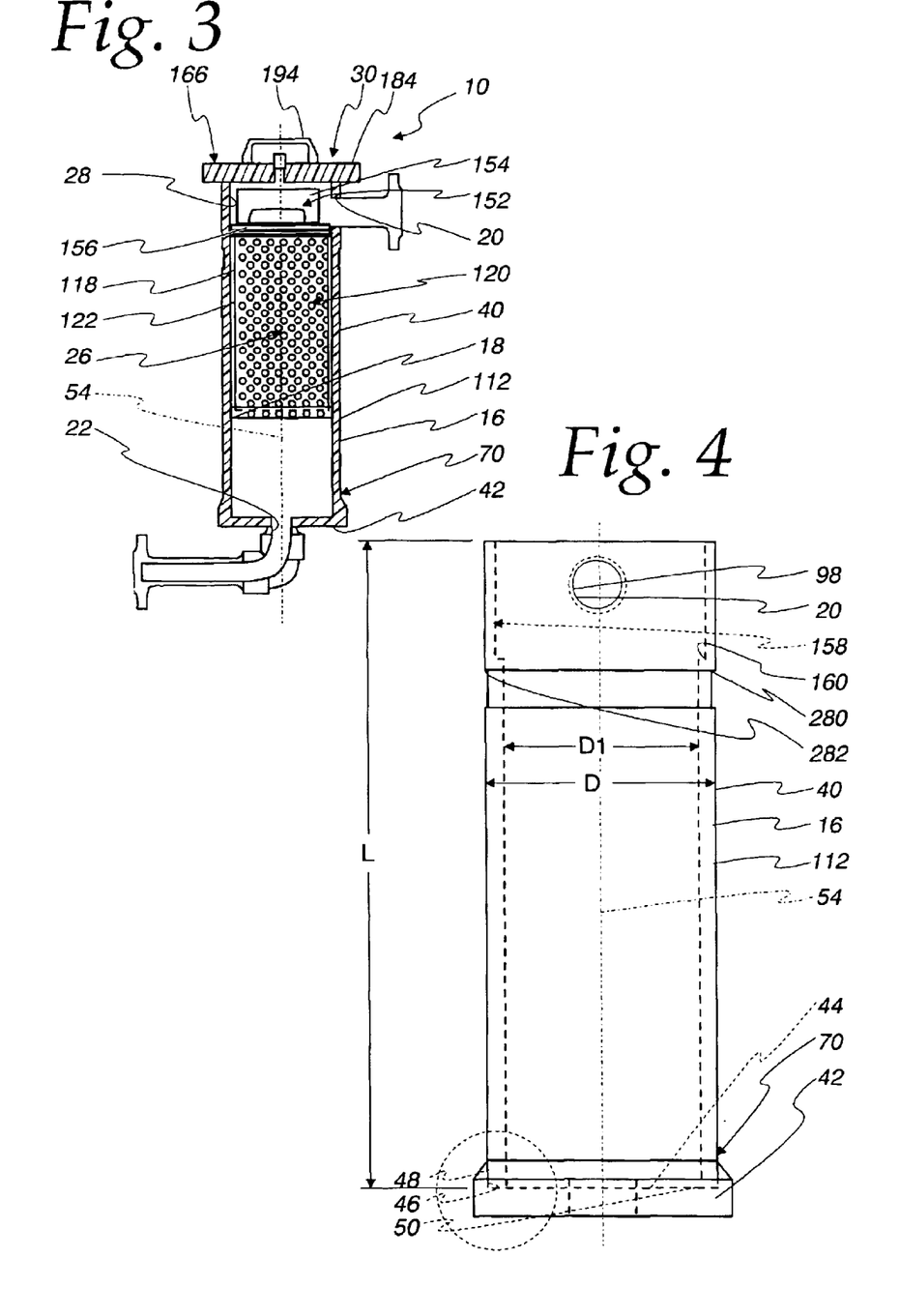
FIG. 3 is a cross-sectional view of a part of the fluid filter of FIGS. 1 and 2, with the components in an operative state and with the mounting base and a portion of the cover assembly removed.
FIG. 4 is an enlarged, elevation view of the housing assembly on the fluid filter of FIGS. 1–3.

Referring initially to FIGS. 1–3, a fluid filter, according to the present invention, is shown at 10. The fluid filter 10 is designed for use in virtually any environment in which fluid flows between a supply 12 and a point of use 14. The fluid filter 10 can be used for: polishing slurries; processing water and plating solutions in the metal plating industry; household and municipal water supplies; pre-filtering for desalination in the consumer market; compositions in the chemical industry; processing water and plating solutions in the electronics industry; magnetic coatings in the audio, video, computer tape, and computer hard disks industry; refiltration for industrial water supplies, etc. The above are just examples of myriad different potential applications for the filter 10, as described below. Further, the fluid filter 10 can be used by itself or in combination with other like, or different, filters.

The fluid filter 10 consists of a housing assembly 16 defining a chamber 18 through which fluid to be filtered can flow between a fluid inlet 20 and a fluid outlet 22. A filtering assembly at 26 resides at least partially within the chamber 18. The filtering fluid moves through the filtering assembly in its flow path between the fluid inlet 20 and fluid outlet 22. The housing assembly 16 has an opening 28 through which at least a part of the filtering assembly 26 can be directed into an operative position within the chamber 18, as shown in FIGS. 2 and 3. The cover assembly at 30 selectively seals the opening 28 and exposes the same to allow the filtering assembly 26 to be accessed, as to be introduced and withdrawn from the chamber 18. A mounting base at 34 supports the housing assembly 16 relative to a surface 36 upon which the fluid filter 10 is mounted.

As seen additionally in FIGS. 4, 5, 12 and 13, the housing assembly 16 consists of a cylindrical housing body 40 to which a base plate 42 is attached. The housing body 40 may be made from cylindrical pipe stock with an outside diameter D and inside diameter D1. The stock material can be cut to the desired vertical length L.

The base plate 42 may be formed from a disk-shaped block having a diameter D3 and a thickness T. The diameter D3 is greater than the diameter D and allows the formation of a cylindrical undercut 44, having a diameter D4, that is slightly greater than the diameter D and having an axial extent identified by the dimension T1. The undercut 44 defines a cylindrical surface portion 46 which closely surrounds an annular surface portion 48 adjacent to the bottom, free, annular edge 50 on the housing body 40. With the housing body 40 and base plate 42 operatively connected, the portions 46,48 cooperate by residing, one with the other, to produce an exposed, annular seam 52 extending fully around the central axis 54 of the housing body 40 and a coincident central axis 56 of the base plate 42.

Figure 5:
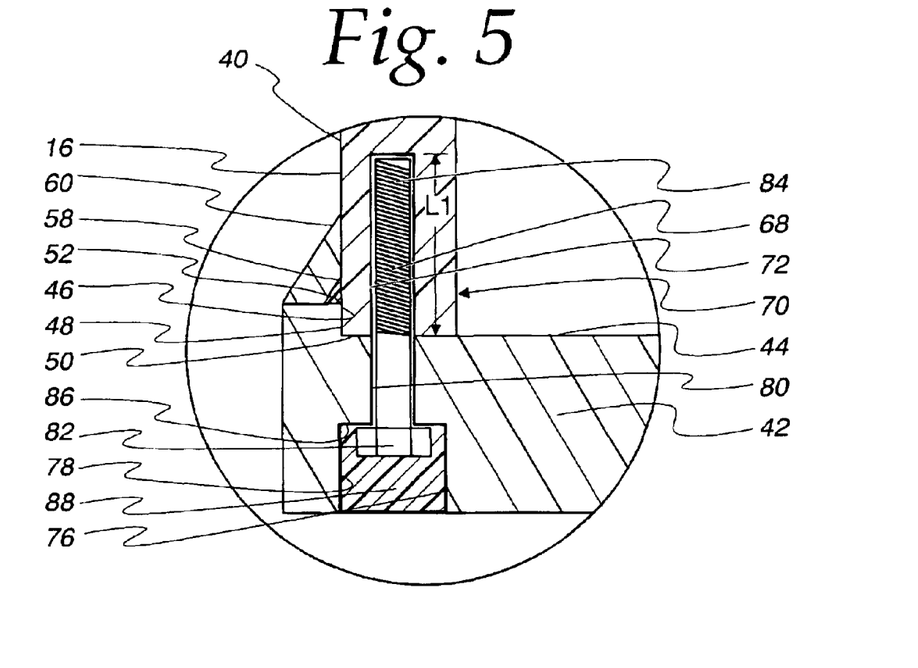
FIG. 5 is an enlarged, cross-sectional view of a portion of the housing assembly within the circle in FIG. 4.

According to the invention, the housing body 40 and base plate 42 are maintained operatively connected by the combination of at least one weld and a plurality of mechanical fasteners. The housing body 40 and base plate 42 are preferably, though not necessarily, made from a non-metal material. At least the cooperating portions 46,48 are preferably made from such non-metal material. The non-metal material may be plastic. Exemplary, suitable plastics for this purpose are at least one, or a combination of: polyvinyl chloride (PVC); (b) polypropylene (PP); (c) chlorinated polyvinyl chloride (CPVC); and (d) polyvinylidene fluoride (PVDF).

As seen most clearly in FIG. 5, once the housing body 40 and base plate 42 are operatively connected, a first weld 58 is formed continuously therearound, as by the use of a natural polypropylene triangle weld rod, that is initially separate from the housing body 40 and base plate 42. After the first weld 58 is completed, a second weld 60 is formed thereover, as by using a straight Teflon® shoe from an extrusion welder. The welding material may be the same as, or different than, the material defining the cooperating portions 46,48.

The mechanical fasteners, used in conjunction with the welds 58,60 to maintain the operative connection between the housing body 40 and base plate 42, are shown as self-tapping, threaded bolts 68, as seen in FIG. 5. The bottom axial end 70 of the housing body 40 is pre-drilled to accommodate the bolts 68. More particularly, blind bores 72 are formed through the annular edge 50 to a depth L1. The bores 72 are preferably spaced equidistantly around the circumferential extent of the edge 50. Five to ten such bores 72 are formed to accommodate a like number of bolts 68. However in the form shown, eight such bores 72 and fasteners 68 are utilized. Preferably, the circumferential intervals between the bores 72 and bolts 68 are substantially equal, though they need not be.

The base plate 42 has a plurality of stepped, through bores 76 formed therein, with each including a larger diameter portion 78 and a smaller diameter portion 80. The through bores 76 in the base plate 42 preferably correspond in number and are aligned, one each, with the blind bores 72 formed in the housing body 40.

The fasteners 68 each have an enlarged head 82 that has a polygonal shape, to be turned by a conventional wrench, and a threaded shank 84. With the housing body 40 and base plate 42 operatively connected, the bolts 68 can be directly initially through the through bores 76 and into the bores 72 in the housing body 40. As the bolts 68 are tightened, the enlarged heads 82 move fully into the larger diameter portions 78 of the through bores 76 to against annular shoulders 86 so as to be countersunk within the bores 76.

To assure sealing of the chamber 18, the fasteners 68 can be installed using equipment that effects a spin-welding connection between the enlarged heads 82 and the cooperating shoulders 86 bounding the larger diameter portions 78 of the through bores 76. The larger diameter portions 78 can be filled by a sealing material 88.

In one exemplary construction, the diameter (D) of the housing body 40 is 8.625 inches, with the base plate 42 having a diameter (D3) of 9.5 inches and a thickness (T) of 1.5 inches. The undercut 44 is made to an axial depth (T1) of 0.5 inches. The bores 76 are drilled through the base plate 42 with a diameter of 0.281 inches. The larger diameter portions 78 are drilled to a diameter of 0.75 inches and to a depth of 0.625 inches. The fasteners 68 are 0.312 inches—18×1.5 inches long 316 stainless steel hex head bolts that are spin-welded using an impact wrench. The sealing material 88 may be extrusion weld natural polypropylene. The first weld may be formed with a 0.175 natural polypropylene triangular weld rod, with the second weld 60 made over the first weld 58 with a #6-bead straight Teflon® shoe from an extrusion welder. The final bead may measure 0.75×0.75×0.875 inches. It should be understood that these dimensions are set out simply to describe one specific embodiment without any limitations intended thereby. The dimensions of all the component parts could be significantly larger or smaller, as the particular application dictates.

The base plate 42 defines the fluid outlet 22. More specifically, a bore 90 is formed through the center of the base plate 42 and is threaded to accommodate a nipple 92, which in turn connects to an elbow 94 for direction of the filtered fluid to the point of use 14. An exemplary diameter for the bore 90 is on the order of 2 inches, with the other above-described dimensions. The particular direction and extent of the conduit 96 extending from the fluid outlet 22 are not important to the present invention.

A like bore 98 is formed through the upper axial end of the housing body 40 to define the fluid inlet 20. The bore 98 may have the same diameter as the bore 90 and is threaded to facilitate connection of a conduit 100. The bore 98 defines the fluid inlet 20 through the housing body 40.

The mounting base 34 consists of a mounting strap 104 defined by arcuate parts 106,108 which are joinable by bolts 110 (one shown) so as to cooperatively surround and embrace the outer surface 112 of the housing body 40. The mounting strap 104 has a conventional construction which allows the diameter to be enlarged to facilitate sliding axially along the outer surface 112 of the housing body 40. By tightening the bolts 110, the effective diameter of the strap 104 can be reduced and the desired axial location of the mounting strap 104 thereby maintained. The vertical strap location determines the mounting height for the housing body 40 relative to the subjacent surface 36. It should also be noted that while the mounting strap 104 is defined as having separate arcuate parts, it could be constructed from a single split ring assembly as used on the cover assembly 30, as hereinafter described.

Mounting legs 114 are fixed to the mounting strap 104 in a tripod arrangement. Additional mounting legs 114 might be utilized. Accordingly, at initial setup, the installer can loosen the bolts 110 and slide the mounting base 34 to the desired axial height, and thereafter tighten the bolts 110 to fix the desired relationship between the mounting base 34 and the housing body 40. As seen in FIG. 2, by moving the mounting strap 104 to the dotted line position, the height of the housing body relative to the support surface 36 is increased. The adjustment range is determined by the axial extent of the outer surface 112 of the housing body 40 with a substantially uniform diameter.

The filtering assembly 26 is shown as a filter bag-type system. However, the invention is not limited to such a design. The filtering assembly 26 consists of a cup-shaped basket assembly 118 as seen most clearly in FIGS. 1, 3 and 6–9. The basket assembly 118 has a wall structure 120 consisting of a cylindrical peripheral wall 122 and a disk-shaped bottom wall 124. The peripheral wall 122 is formed from a sheet, such as one made from natural polypropylene. As one example, the sheet may have a thickness of 0.125 inches, a width of 13.25 inches, and a length of 21 inches. With these dimensions, 35 rows of 0.5 inch diameter holes 126 are formed, with the holes 126 spaced on 1.125 inch centers, and with each row offset 0.562 inches.

Figure 6:
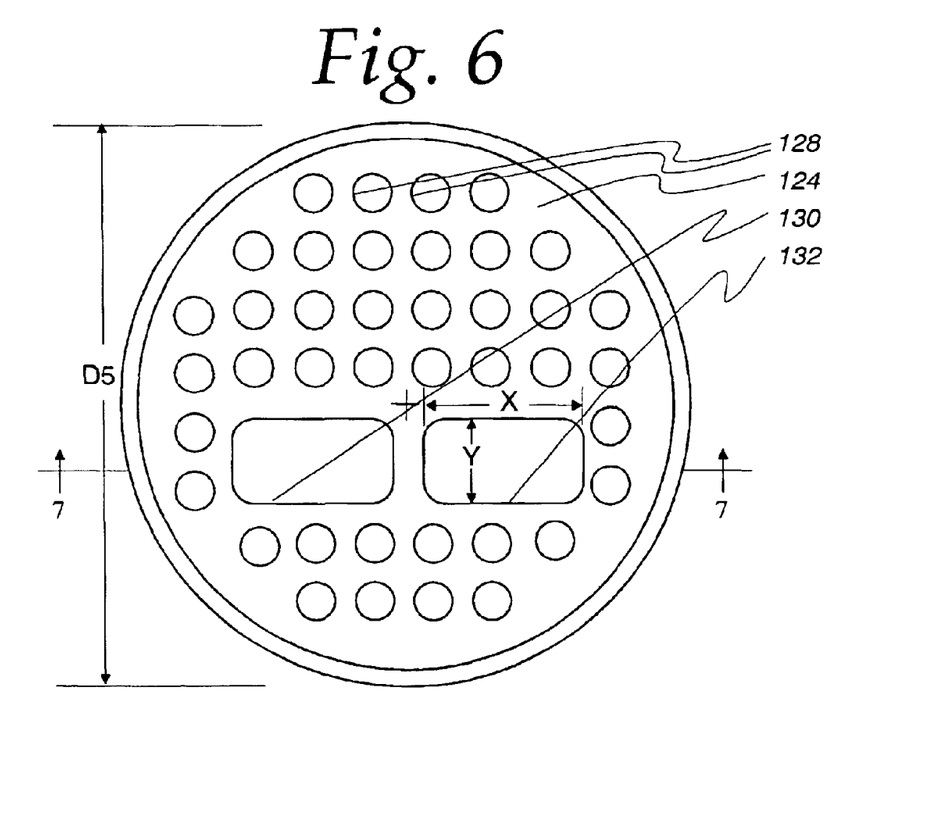
FIG. 6 is an enlarged, plan view of a bottom wall on the filtering assembly on the fluid filter of FIGS. 1–3.
Figure 7:
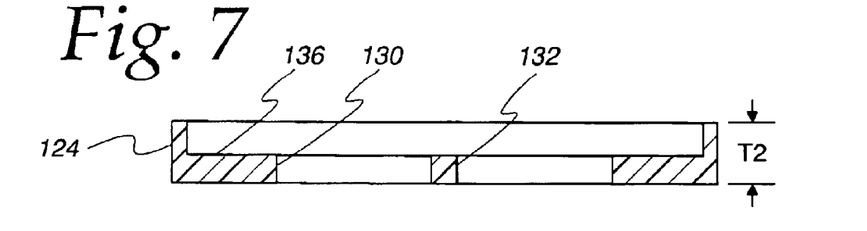
FIG. 7 is a cross-sectional view of the bottom wall on the filtering assembly taken along line 7—7 of FIG. 6.

The bottom wall 124 can likewise be made from a polypropylene material, having a diameter D5 that may be on the order 7.25 inches, with a thickness T2 on the order 0.75 inches. The bottom wall has eight rows of holes 128, which may be spaced on 0.75 inch centers and each have a diameter on the order 0.5 inches. Spaced, rectangular slots 130,132 are formed through the bottom wall 124 and have an exemplary longer dimension X of 2.05 inches and a shorter dimension Y on the order 1.125 inches. The bottom wall 124 has an annular undercut 136 to receive the peripheral wall 122.

Figure 8:
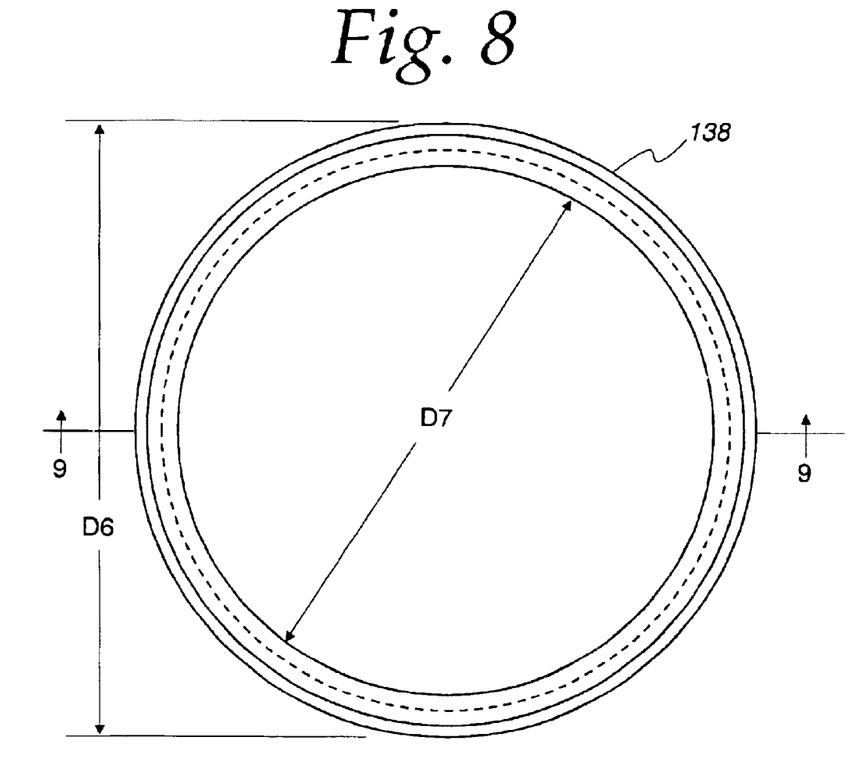
FIG. 8 is an enlarged, plan view of a reinforcing/spacing ring at the upper region of the filtering assembly shown in FIGS. 1–3.
Figure 9:
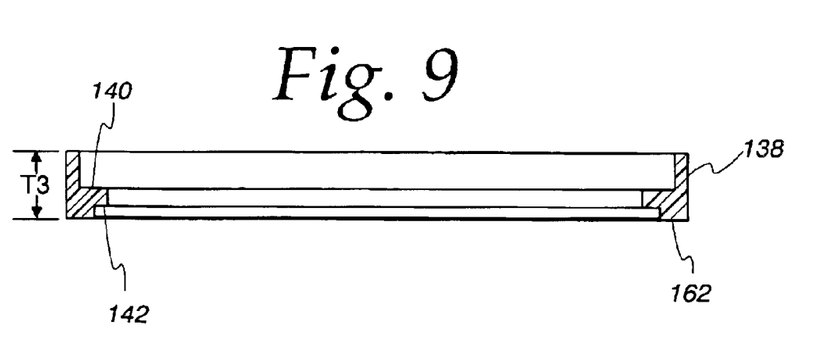
FIG. 9 is a cross-sectional view of the reinforcing/spacing ring taken along line 9—9 of FIG. 8.

A top ring 138 may likewise be made from a polypropylene material with a thickness T3 on the order of 0.75 inches and an outside diameter D6 on the order of 7.665 inches and an inner diameter D7 on the order of 6.625 inches. The upper portion of the top ring 138 has an annular undercut 140, with the underside having an undercut 142, with the former having a larger diameter.

The sheet defining the peripheral wall 122 is rolled into a cylindrical shape and welded at its ends and thereafter to a reinforcing strip 144 extending axially along the length thereof. A weld may be produced along the entire length of the reinforcing strip 144 at its circumferentially spaced edges. The opposite axial ends of the peripheral wall 122 are then placed in the undercuts 136,142 in the bottom wall 124 and top ring 138, respectively, and welded thereto.

An intermediate ring 146 is welded to the outside of the peripheral wall approximately midway between the bottom wall 124 and top ring 138. The bottom wall 124, top ring 138 and intermediate ring 146 cooperatively reinforce the peripheral wall 122 and perform a spacing function between the basket assembly 118 and the housing body 40.

An O-ring 150 is placed in the undercut 140 in the top ring 138. A filter lock assembly 152, consisting of a handle 154 and integral locking ring 156, cooperates with the housing body 40 in conventional fashion. The upper region of the chamber 18 has a localized increased diameter 158 which defines an annular, axially facing shoulder 160 on the housing body 40 against which the underside edge 162 of the top ring 138 bears with the filtering assembly 26 operatively positioned relative to the housing assembly 16.

Once the basket assembly 118 is installed, the appropriate filter bag 164 can be put in place after which the filter lock assembly 152 is installed. Thereafter, the cover assembly 30 is installed. The cover assembly 30 consists of a cover element 166, as shown in FIGS. 1–3, 10 and 11, and a cover locking assembly 168, as shown in FIGS. 1, 2 and 14–19. The cover element 166 has a disk shape with a diameter D8 and thickness T4. As one example, the cover element 166 can be made from a natural polypropylene with a diameter D8 on the order of 12 inches and a thickness T4 on the order of 1.5 inches.

Figure 10:
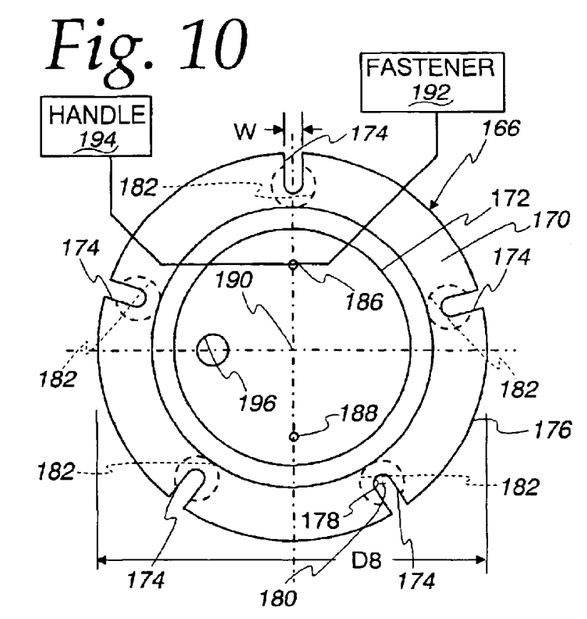
FIG. 10 is an enlarged, bottom view of a cover plate on the cover assembly on the fluid filter of FIGS. 1–3.
Figure 11:
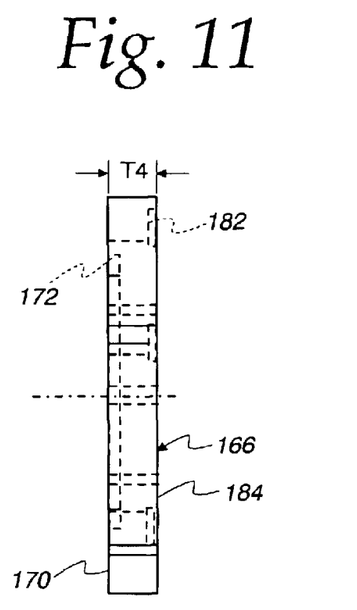
FIG. 11 is an enlarged, elevation view of the cover plate in FIG. 10.
Figure 12:
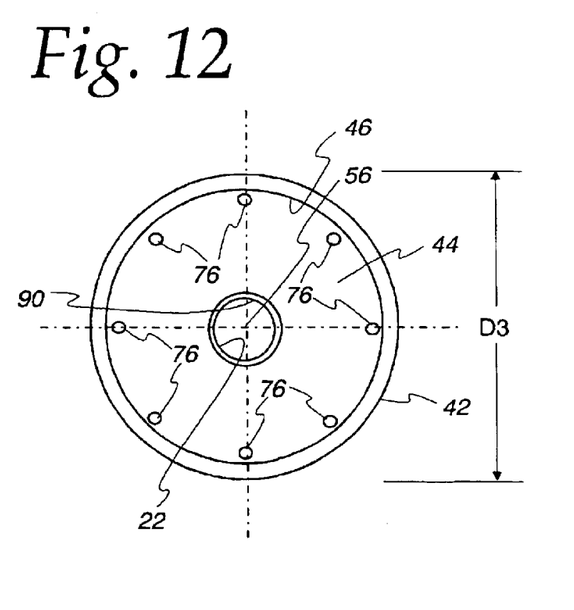
FIG. 12 is an enlarged, plan view of a base plate on the housing assembly on the fluid filter of FIGS. 1–3.
Figure 13:
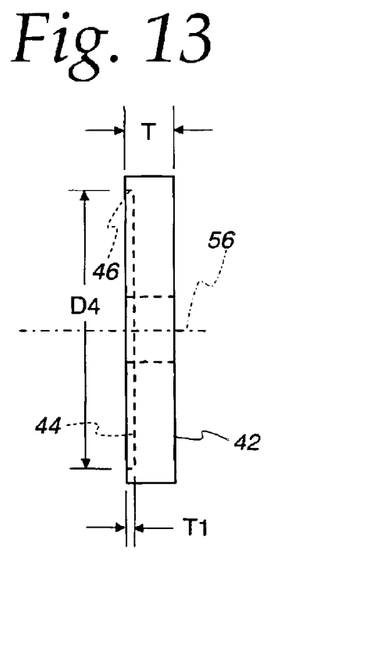
FIG. 13 is an enlarged, elevation view of the base plate in FIG. 12.

The underside 170 has an annular groove 172 formed therein. Five radially outwardly opening, U-shaped slots 174 are formed through the peripheral edge 176. The slots 174 are spaced equidistantly around the peripheral edge 176. Each slot 174 has a U-shaped base 178 defined by a constant radius on a center 180. Counterbores 182 are formed partially through the top side 184 of the cover element 166 so that the centers of the counterbores 182 are coincident with the centers 180. An exemplary radius for the base 178, and thus the width W of each slot 174, may be on the order of 0.562 inches.

Bores 186,188 are formed equally spaced at diametrically opposite locations from the center 190 of the cover element 166. The bores 186,188 are threaded to each accept a fastener 192, which is threadedly engaged with a U-shaped handle 194. The handle 194 is graspable to facilitate manipulation of the cover element 166.

The cover element 166 has a through bore 196, on the order of one half inch in diameter, which is threaded to receive a nipple 198, to accept a pressure gauge/air release assembly 200.

The cover element 166 is maintained on the housing body, so as to close the opening 28, by a cover locking assembly 168. The cover locking assembly 168 consists of a band 202 having a width W2 that may be on the order 1.5 inches. The band 202 has a length sufficient to extend around the outer surface 112 of the housing body 40. The band 202 is formed into a circular shape, shown in FIG. 14, with adjacent, spaced ends 204,206. Bolt plates 208,210 are welded to the band 202 at the ends 204,106, respectively, so as to project substantially orthogonally from the outer surface 212 of the band 202.

Figure 14:
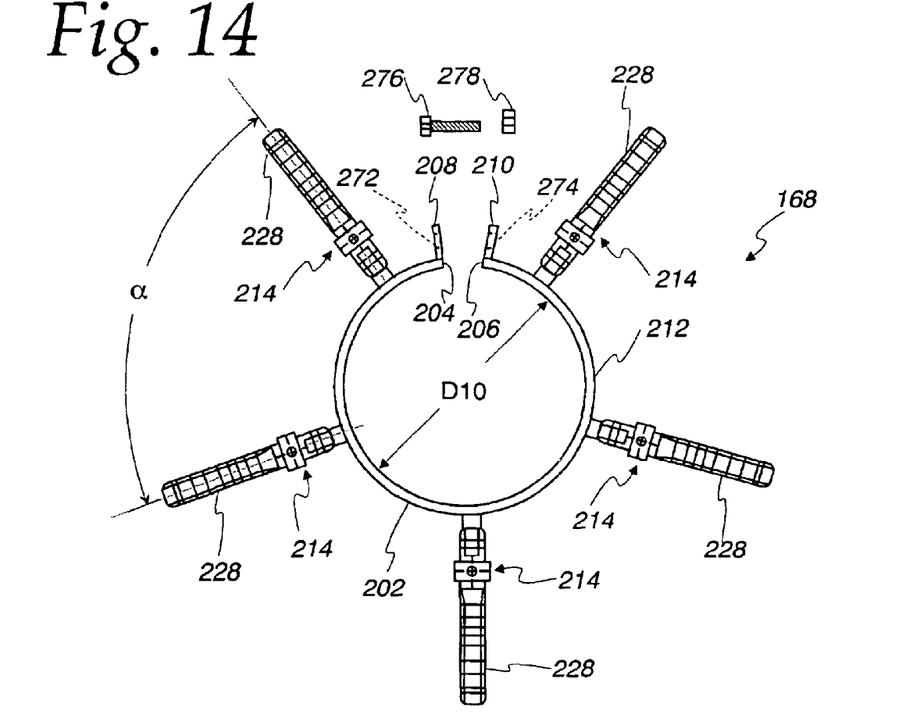
FIG. 14 is an enlarged, plan view of a locking assembly for the cover plate in FIGS. 10 and 11 and including a plurality of draw-type clamp assemblies.

A plurality, and in this embodiment five, draw-type clamp assemblies 214, each of like construction, are welded to the outer surface 212 so as to be equidistantly spaced around the circumference thereof. In the case of the five clamp assemblies 214 shown, the centers of each clamp assembly 214 are spaced from adjacent clamp assemblies 214 by an angle α, which is on the order of 72°.

Figure 15:
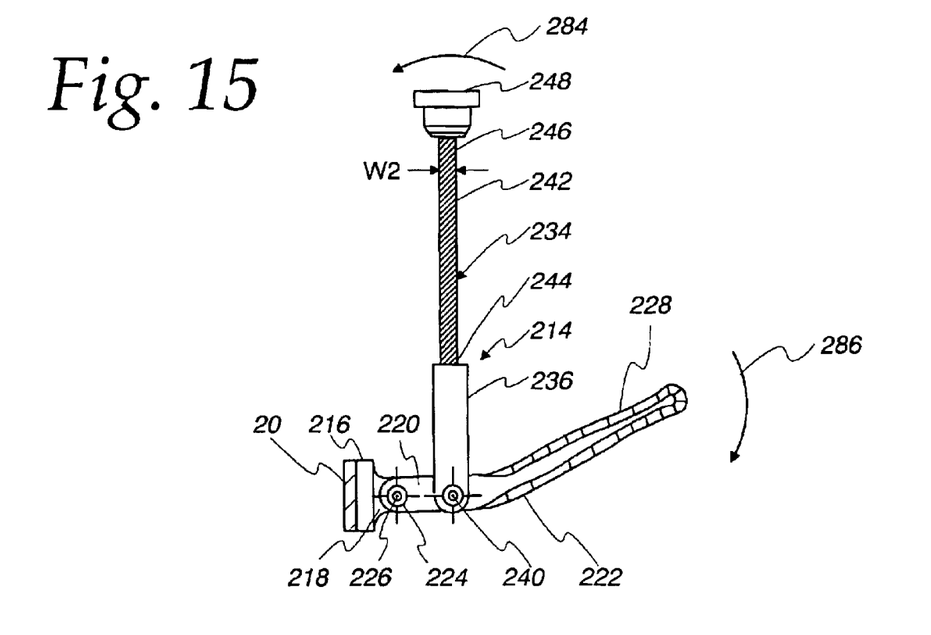
FIG. 15 is an enlarged, elevation view of one of the clamp assemblies on the locking assembly of FIG. 14.

Each clamp assembly 214 consists of a base 216, which is welded to the band outer surface 212. Each base 216 has a projection 218 which is straddled by a bifurcated end 220 of a bent draw handle 222. The bifurcated end 220 and projection 218 are connected by a pin 224 which guides pivoting movement between the end 220 of the draw handle 222 and the projection 218 about an axis 226. The draw handle 222 has an elongate, graspable portion 228, remote from the end 220, which facilitates pivoting of the draw handle 222 about the axis 226.

Figure 16:
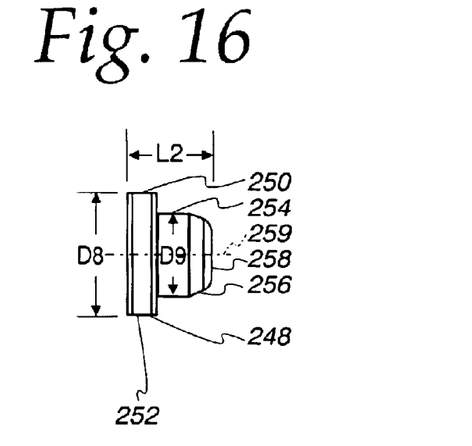
FIG. 16 is an enlarged, elevation view of a locking knob on each clamp assembly that bears upon the cover plate.
Figure 17:
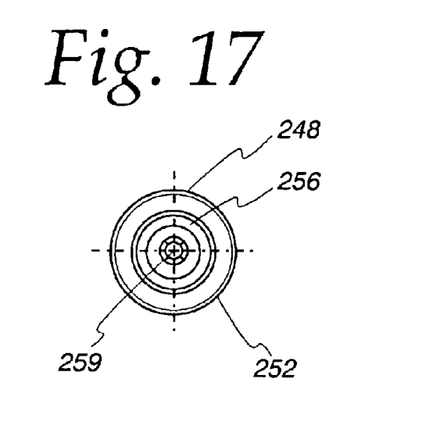
FIG. 17 is an enlarged, bottom view of the locking knob in FIG. 16.

An adjustable draw rod 234 has a base end 236 connected to the draw handle 222, at a location intermediate the ends thereof, for pivoting movement relative to the draw handle 222 about an axis 240, that is substantially parallel to the axis 226. The effective length of the draw rod 234 is varied by oppositely rotating a threaded rod 242 relative to the base end 236. One end 244 of the rod 242 is threaded into the base end 236, with the opposite end 246 threadably connected to a securing/locking knob 248. The securing knob 248 has a stepped outer diameter. Each securing knob 248 may have a diameter D8 on the order of 1.5 inches and an axial length L2 on the order of one inch. Each securing knob 248 has an outer diameter portion 250 with an outer surface 252 which is knurled to facilitate grasping and turning thereof. The outer surface 252 steps down to a uniform diameter portion 254 having a diameter (D9) on the order of one inch. The outer surface has a bevel 256 adjacent to the end 258. The angle of the bevel may be on the order of 17° relative to the central axis 259 of the knob 248 but may vary over a significant range.

Figure 18:
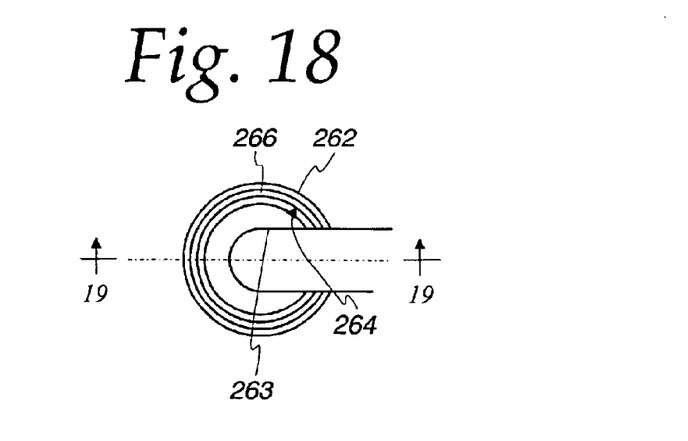
FIG. 18 is an enlarged, plan view of a washer that is interposed between the locking knob in FIGS. 16 and 17 and the cover plate in FIGS. 10 and 11.
Figure 19:
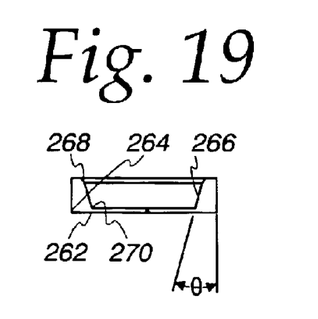
FIG. 19 is a cross-sectional view of the washer taken along line 19—19 of FIG. 18.
Figure 20:
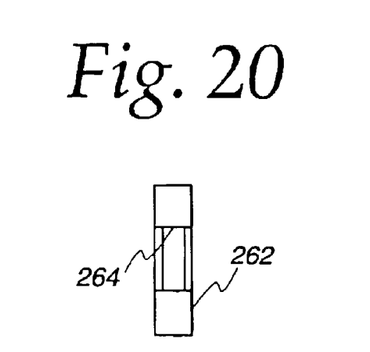
FIG. 20 is an enlarged, elevation view of the washer taken from the right side in FIG. 18.

C-shaped washers 262 are disposed, one each, in the counterbores 182 (FIG. 10) on the top side 184 of the cover element 166. The washers 162 have slots 263 corresponding in shape and size to the slots 174, which have a width W sufficient to loosely accept the width W2 of the threaded rods 242. The washers 162 have a receptacle 264 to receive the outer surface portion 254 of the securing knobs 248. The receptacle 264 is bounded by a surface 266 that tapers progressively from the top 268 to the bottom 20 of the receptacle 254 at an angle θ to vertical. The angle θ may be on the order of 40°.

The bolt plates 208,210 have through bores 272,274, respectively, to accept a bolt 276. The bolt 276 is directed through the bolt plates 208,210 and receives a nut 278. By tightening the nut 278, the bolt plates 208,210 are drawn towards each other to thereby effectively reduce the inside diameter D10 of the band 202. The band 202 is dimensioned to reside within an annular undercut 280 (FIG. 4) in the outer surface 112 of the housing body 40. The undercut 280 defines an annular, downwardly facing shoulder 282 against which the band 202 can be braced as the cover locking assembly 168 is installed. With the band 202 tightened securely to the housing body 40 within the undercut 280, each of the draw rods 234 can be pivoted in the direction of the arrow 284 about its associated axis 240 to move the rods 242 through the slots 174,264 in the cover element 166 and washers 262, respectively. The securing knobs 248 can then be tightened a prescribed amount after which the draw handles 222 are pivoted in the direction of the arrow 286 in FIG. 15 about the axes 226, thereby drawing the securing knobs 248 downwardly against the washers 262. The pivoting of the draw handles 222 continues until an overcenter locked position is realized, as shown in FIG. 2, so that a constant pressure is maintained upon the cover element 166 against the housing body 40. A lid gasket 290 (FIG. 1) is provided to effect a positive seal between the cover element 166 and housing body 40.

With the inventive structure, fluids can be filtered at a relatively high pressure and volume without leakage. Safeguards may be employed to prevent leakage at all connections, such as at the fluid outlet 222 for the conduit 96. For example, the connection between the nipple 92 to the elbow 94, shown in FIG. 1, can be bottomed out and then welded in one or more separate operations, as at all the threaded connections. Teflon® tape can also be used at all threaded connections.

All of the mechanical fasteners that are exposed to the fluid can be made from a non-metal material. Accordingly, no metal part of the fluid filter 10 need be exposed directly to the fluid. The metal parts utilized throughout can be made from stainless steel so as to have good integrity and strength as well as good resistance to degradation in the presence of the various fluids being filtered.

While the invention has been described with particular reference to the drawings, it should be understood that various modifications could be made without departing from the spirit and scope of the present invention.

What is claimed is:

1. A fluid filter comprising:
   a housing assembly defining a chamber through which fluid to be filtered can flow;
   the housing assembly having a fluid inlet and a fluid outlet;
   a filtering assembly within the chamber through which fluid moving between the fluid inlet and fluid outlet passes,
   the housing assembly having an opening through which at least a part of the filtering assembly can be directed into an operative position within the chamber; and
   a cover assembly for sealing the opening,
   the housing assembly comprising a housing body and a base plate connected to the housing body,
   the base plate secured to the housing body through at least one weld and a plurality of mechanical fasteners.

2. The fluid filter according to claim 1 wherein the housing body and base plate have cooperating portions that reside one with the other with the housing body and base plate operatively connected.

3. The fluid filter according to claim 2 wherein the housing body and base plate each have a central axis, the cooperating portions define a seam that extends continuously around the central axes, and the at least one weld is formed at the seam.

4. The fluid filter according to claim 3 wherein the cooperating portions comprise a non-metal material.

5. The fluid filter according to claim 4 wherein the weld is defined by a non-metal material that is the same as the non-metal material defining the cooperating portions.

6. The fluid filter according to claim 5 wherein the non-metal material comprises at least one of: (a) polyvinyl chloride (PVC); (b) polypropylene (PP); (c) chlorinated polyvinyl chloride (CPVC); and (d) polyvinylidene difluoride (PVDF).

7. The fluid filter according to claim 4 wherein the at least one weld extends continuously around the central axes.

8. The fluid filter according to claim 7 wherein a second weld is made over the at least one weld.

9. The fluid filter according to claim 4 wherein the at least one weld is formed by a material that is initially separate from the cooperating portions.

10. The fluid filter according to claim 3 wherein the cooperating portions comprise a plastic material.

11. The fluid filter according to claim 1 wherein the base plate defines the fluid outlet.

12. The fluid filter according to claim 1 wherein a second weld is made over the at least one weld.

13. The fluid filter according to claim 1 wherein the at least one mechanical fastener extends into the housing body and base plate.

14. The fluid filter according to claim 13 wherein the at least one mechanical fastener comprises a threaded fastener.

15. The fluid filter according to claim 13 wherein the at least one mechanical fastener comprises a self-tapping fastener.

16. The fluid filter according to claim 15 wherein the housing body is pre-drilled to receive the at least one mechanical fastener.

17. The fluid filter according to claim 2 wherein the cooperating portion on the housing body comprises an annular edge extending around a central axis and the at least one mechanical fastener extends into the annular edge.

18. The fluid filter according to claim 17 wherein the base plate has a stepped through bore with a larger diameter portion and a smaller diameter portion and the at least one mechanical fastener has an enlarged head and is directed through the through bore into the annular edge so that the enlarged head is countersunk within the larger diameter portion of the through bore.

19. The fluid filter according to claim 18 wherein the base plate comprises a non-metal material and the at least one mechanical fastener is spin-welded to the base plate.

20. The fluid filter according to claim 18 wherein a filler material fills the larger diameter portion of the through bore.

21. The fluid filter according to claim 17 wherein there are a plurality of mechanical fasteners extending through the base plate into the annular edge.

22. The fluid filter according to claim 21 wherein the annular edge has a circumferential extent and the plurality of mechanical fasteners are spaced at prescribed intervals around the circumferential extent of the annular edge.

23. The fluid filter according to claim 22 wherein the prescribed intervals are substantially equal.

24. The fluid filter according to claim 21 wherein there are from 5–10 mechanical fasteners in the plurality of mechanical fasteners.

25. The fluid filter according to claim 1 wherein the filtering assembly comprises a wall structure capable of operatively supporting a filter material so that fluid to be filtered can pass through the filter material operatively supported by the wall structure as fluid to be filtered flows between the fluid inlet and fluid outlet.

26. The fluid filter according to claim 25 wherein the wall structure defines a perforate cup-shaped receptacle.

27. The fluid filter according to claim 26 wherein the filtering assembly further comprises a filter bag that is supported by the wall structure within the cup-shaped receptacle.

* * * * *